United States Patent
Houk et al.

(10) Patent No.: US 7,843,178 B1
(45) Date of Patent: Nov. 30, 2010

(54) DC/DC CONVERTER STARTUP WITH FREQUENCY RAMPING

(75) Inventors: Talbott Mead Houk, Monte Sereno, CA (US); Muthu Subramanian, Fremont, CA (US); Goran Perica, Menlo Park, CA (US)

(73) Assignee: Linear Technology Corporation, Milpitas, CA (US)

( * ) Notice: Subject to any disclaimer, the term of this patent is extended or adjusted under 35 U.S.C. 154(b) by 87 days.

(21) Appl. No.: 12/333,933

(22) Filed: Dec. 12, 2008

Related U.S. Application Data

(60) Provisional application No. 61/013,693, filed on Dec. 14, 2007.

(51) Int. Cl.
*G05F 1/00* (2006.01)
(52) U.S. Cl. .................................. 323/222; 323/901
(58) Field of Classification Search ............... 323/222, 323/901, 283
See application file for complete search history.

(56) References Cited

U.S. PATENT DOCUMENTS

| 6,198,258 B1 * | 3/2001 | Ando et al. .................. 323/222 |
| 6,469,917 B1 * | 10/2002 | Ben-Yaakov ................. 363/44 |
| 7,183,753 B2 * | 2/2007 | Tsuruya ...................... 323/222 |

* cited by examiner

*Primary Examiner*—Shawn Riley
(74) *Attorney, Agent, or Firm*—McDermott Will & Emery LLP

(57) ABSTRACT

Control circuitry controls a boost regulator during a start-up period. The control circuitry may comprise an oscillator for generating a clock signal. The oscillator may be configured for ramping up a frequency of the clock signal in accordance with an voltage to be applied to the oscillator and varied during the start-up period. The control circuit may further include a switching circuit configured for controlling a power switch of the boost regulator in response to the clock signal from the oscillator. The switching circuit can control the power switch to have an on-time which is largely independent of the operating frequency of the oscillator. The voltage to be applied to the oscillator may have the same initial voltage level upon startup of the control circuit, independent of an output voltage of the boost regulator.

7 Claims, 17 Drawing Sheets

US 7,843,178 B1

DC/DC CONVERTER STARTUP WITH FREQUENCY RAMPING

RELATED APPLICATIONS

This application claims priority from U.S. Provisional Application No. 61/013,693, filed on Dec. 14, 2007, which is incorporated herein by reference.

TECHNICAL FIELD

This disclosure relates to power supply systems, and more particularly, to circuitry and methodologies for providing soft start of a DC/DC converter.

DESCRIPTION OF RELATED ART

FIG. 1 is a block diagram of a peak current mode boost controller which generally takes a DC input voltage $V_{IN}$ and produces a DC output voltage $V_{OUT}$ that is higher in value than input voltage $V_{IN}$, but of the same polarity. Boost controller 10 may comprise, for example, internal components within a semiconductor chip and external components outside of the chip. The internal components comprise a transconductance error amplifier 12, a voltage to current (V to I) converter 14, a current comparator 16, a free running oscillator (OSC) 18, a PWM (pulse width modulation) latch 20, a gate driver 22, a PNP transistor, and current source 26. The external components comprise a power MOSFET M1, a sense resistor RSENSE, an input capacitor $C_{IN}$, an inductor L, a diode D, and an output capacitor $C_{OUT}$. A resistance voltage divider R1/R2 divides output voltage $V_{OUT}$, and the divided voltage is fed back to the inverting input of error amplifier 12 as feedback voltage $V_{FB}$. An $I_{th}$ pin is an error amplifier output/compensation pin to which external compensation components comprising a resistor $R_C$ and a capacitor $C_{C1}$ are coupled. A SS (soft-start) pin of the chip has an external capacitor $C_{SS}$ to be charged with current source 26.

OSC 18 generates a clock signal and controls the set input of PWM latch 20 to set the latch. The reset input of PWM latch 20 is controlled by current comparator 16 that resets the latch when a voltage across a resistor RSENSE coupled to power MOSFET M1 exceeds a voltage across a resistor RLOOP. Power MOSFET M1 is turned ON when PWM latch 20 is set, and is turned OFF when the latch is reset.

Error amplifier 12 compares feedback voltage $V_{FB}$ with a reference voltage $V_{REF}$ to generate an error current which is supplied to the $I_{th}$ pin. A voltage on the $I_{th}$ pin is applied to V to I converter 14, and an output current from the converter generates a voltage across resistor RLOOP, which voltage represents a peak current sense threshold. The peak current sense threshold is variable in response to feedback voltage $V_{FB}$ from voltage divider R1/R2, as well as a voltage on the SS pin, discussed below.

The SS pin of the chip allows capacitor $C_{SS}$ to be charged with current source 26, and a voltage ramp on the pin controls the current delivered to the output of boost controller 10 by controlling the current sense threshold of current comparator 16. The voltage on the SS pin is applied to the base of PNP transistor 24 that clamps a voltage on the $I_{th}$ pin generated by the output of error amplifier 12. A clamp level of PNP transistor 24 is determined by the voltage on the SS pin which ramps up during the start-up period in response to the capacitor $C_{SS}$ charged with current source 26.

A slow voltage ramp on the SS pin is reflected on the output of error amplifier 12, which causes a similar ramp of the peak current sense threshold of current comparator 16. The current sense threshold is ramped from a zero current value to a peak current value in a slow manner. This causes power MOSFET M1 to turn ON either until a maximum on-time expires or until the current sense threshold is reached whichever is shorter.

The frequency of the clock signal from OSC 18 to set PWM latch is the same as the free running frequency programmed by a user. Boost controller 10 operates with a constant frequency of a clock signal from OSC 18 at the very beginning of its operation when the user turns on, for example, the chip. There is no modulation of the frequency of the boost controller.

Boost controller 10 typically has a minimum on-time of power MOSFET M1. As discussed above, OSC 18 sets PWM latch 20 to turn on power MOSFET M1. The MOSFET then starts ramping up a current on inductor L. If the inductor current rises quickly and exceeds a steady state maximum level of inductor L, inductor current $I_L$ should be turned off. Then, current comparator 16 trips and resets PWM latch 20 so as to turn off power MOSFET M1. During this process, there are signal propagation delays caused by, for example, error amplifier 12, current comparator 16, and PWM latch 20, after the inductor current exceeds the steady state maximum level. A finite amount of time is required to turn off the MOSFET after it is turned on. Such propagation delays determine the minimum on-time of power MOSFET. Accordingly, regardless of how great an overcurrent on inductor L is, the control loop cannot turn off power MOSFET M1 before the minimum on-time expires.

In a typical boost controller architecture, the overcurrent at inductor L is finite at the time the controller starts up due to the minimum on-time. Following equations (1) and (2) describe the inductor current:

$$\Delta_{IL\_POS} = t_{ON(MIN)} * V_{IN}/L \qquad (1)$$

$$\Delta_{IL\_NEG} = t_{OFF} * (V_{OUT} - V_{IN})/L \qquad (2)$$

$\Delta_{IL\_POS}$ is an inductor ramping up current during the minimum on-time of power MOSFET M1. This amount is fixed because the minimum on-time of the power MOSFET is a fixed amount, and input voltage $V_{IN}$ and inductance L are also fixed amounts. $\Delta_{IL\_NEG}$ is determined by an off-time of power MOSFET M1 times $(V_{OUT}-V_{IN})/L$. When the boost controller starts up, the value of $(V_{OUT}-V_{IN})$ is very small. $\Delta_{IL\_POS}$ is thus significantly greater than $\Delta_{IL\_NEG}$.

FIG. 2 shows waveforms representing output voltage $V_{OUT}$, switch node voltage $V_{SW}$, and inductor current $I_L$. Output voltage $V_{OUT}$ ramps up during a start-up period of boost controller 10, for example, from 6.5V to 24.5V in 12 ms. Corresponding waveforms of switch node voltage $V_{SW}$ at power MOSFET M1 and inductor current $I_L$ on inductor L are also shown. FIG. 3 shows zoomed-in waveforms of FIG. 2. FIG. 4 shows waveforms in a normal operating condition of the conventional boost controller after output voltage $V_{OUT}$ has reached, for example, the final value of 24.5V.

In boost controller 10 shown in FIG. 1, the controller operates at the free running frequency even during the soft-start period. As shown in FIGS. 2 and 3, boost controller 10 delivers substantial energy to the output in the minimum on-time during the start-up period. The minimum on-time is in the hundreds of nanosecond range. Under certain input-output conditions at the start-up, inductor current $I_L$ can overshoot with respect to its steady state maximum level. This high current can stress power MOSFET M1, and can cause it to thermally run away and fail catastrophically.

In more detail, inductor current $I_L$ quickly ramps up once the controller is turned on as shown in FIGS. 2 and 3. In response, the control loop operates to turn off power MOSFET M1 as quickly as possible. As shown in FIG. 3, during the off time of power MOSFET M1, the inductor current does not decay significantly. In other words, the inductor current does not go below the level at the beginning of each switching cycle, but slightly decreases. Then, when power MOSFET M1 is turned on again, inductor current $I_L$ increases from essentially the same magnitude of the current in the last cycle. It is apparent from FIG. 3 that inductor current $I_L$ ramps up like a stair step. Because inductor current $I_L$ ramps up to a very high level, the control loop cannot maintain the maximum current below the steady state maximum level of inductor L.

If the inductor current exceeds the steady state maximum level, the inductor saturates. When the inductor saturates, an effective inductance goes to zero, and inductor L acts like a resistor. As a result, $\Delta_{IL\_POS}$ of equation (1) goes to infinity because the inductance of inductor L goes to zero. If the inductor current ramps up to reach the saturation level, then the current does not go down. In the next cycle, the current ramps up from, for example, a few amperes of current to tens of amperes of current, because the inductor current is limited only by the resistance during the on-time of power MOSFET M1. Accordingly, power MOSFET M1 will be damaged because of the greater magnitude of the current passing therethrough.

To solve the above problems associated with the boost controller, a foldback amplifier may be utilized. It has been well known that the foldback amplifier is provided to a buck controller to control a frequency of a voltage controlled oscillator (VCO). Components of a feedback loop for the buck controller can be almost the same as that shown in FIG. 1. Feedback voltage $V_{FB}$ from the output of the buck controller is fed back to the error amplifier. The controller modifies the operation frequency of the oscillator based on the feedback voltage which is applied to the inverting input of the foldback amplifier. As a result, the operation frequency of the VCO is adjusted in response to the output voltage of the buck controller. For example, when the feedback voltage is reduced below some arbitrary threshold, the operating frequency will be reduced, which may make it possible to increase the off-time of the power MOSFET in order to allow inductor current $I_L$ to decay below the level it was at the beginning of each switching cycle during the off-time. FIG. 5 is a block diagram showing a boost controller including foldback amplifier 28 to control a voltage to be applied to a voltage controlled oscillator (VCO) 30. However, foldback amplifier 28 does not necessarily work for boost controller 10a for the following reasons.

When boost controller 10a starts up, the output voltage of the controller is equal to the input voltage minus the forward voltage of diode D. In more detail, output voltage $V_{OUT}$ of the boost controller in regulation is $V_{OUT}=V_{FB}*(1+R2/R1)$, but before switching starts, $V_{OUT}=V_{IN}-V_{FD}$, where $V_{FD}$ is the forward voltage of diode D. Accordingly, the feedback voltage at start-up for boost controller 10a is not equal to 0 V.

FIG. 6 is a graph showing a relationship between a normalized voltage and normalized clock frequency. A high $V_{IN}$, high $V_{OUT}$ boost converter design during start-up has a value of feedback voltage $V_{FB}$ greater than $0.5*V_{FB}$ which is a reference voltage of foldback amplifier 28 (see point A on FIG. 6). This will have no frequency foldback, and thus, may not prevent inductor L from becoming saturated.

For example, the voltage drop before switching between the input and the output of the boost controller is the voltage drop across diode D, for example, 0.7V. Assuming that the input voltage is 12V and the output boosted voltage is 16V, the output voltage before regulation ($V_{OUT}=V_{IN}-V_{FD}$) may be 11.3 V. In this case, when the boost converter starts up, the feedback voltage is 11.3V/16V (=0.706 which is very close to point A on FIG. 6) or 70.6% of its final regulated value which is already very close to its full value even before any switching operation starts. The feedback voltage is, therefore, greater than $0.5*V_{FB}$, and there is no frequency foldback.

On the other hand, a low $V_{IN}$ and high $V_{OUT}$ design during start-up has feedback voltage $V_{FB}$ less than $0.5*V_{FB}$ (see point B on FIG. 6), and has some frequency foldback. Assuming that boost controller 10a steps up an input voltage of 12V to an output voltage of 48V, the output voltage $V_{OUT}$ before start-up ($V_{OUT}=V_{IN}-V_{FD}$) is 11.3V. In this case, the feedback voltage is 11.3V/48V=0.235, which is very close to point B on FIG. 6.

It is noted that in FIG. 5, the voltage input to VCO 30 is not an independent voltage, but is feedback voltage $V_{FB}$. The voltage on the feedback node in the figure is varied by an initial condition of the voltage of the boost controller. If the voltage applied to VCO 30 is not consistent at the start-up (see points A and B in FIG. 6), the boost converter may or may not have adequate frequency foldback, and therefore the MOSFET M1 may not be protected from catastrophic failure. This is the reason why the foldback amplifier cannot be used with boost converters.

SUMMARY OF DISCLOSURE

Embodiments detailed herein describe control circuitry that controls a boost regulator during a start-up period. In one aspect, the control circuitry may comprise an oscillator for generating a clock signal. The oscillator may be configured for ramping up a frequency of the clock signal in accordance with an voltage to be applied to the oscillator and varied during the start-up period. The control circuit may further include a switching circuit configured for controlling a power switch of the boost regulator in response to the clock signal from the oscillator. The switching circuit can control the power switch to have an on-time which is largely independent of the operating frequency of the oscillator. The voltage to be applied to the oscillator may have the same initial voltage level upon startup of the control circuitry, independent of an output voltage of the boost regulator.

The control circuitry further comprises a charging circuit configured for charging a capacitor during the start-up period to generate the voltage to be applied to the oscillator, the voltage being varied in accordance with a charge of the capacitor. The oscillator increases, during the start-up period, the frequency of the clock signal from a minimum level to a normal operation level in accordance with the applied voltage. The oscillator is configured for varying charge current and discharge current therein in accordance with the applied voltage in order to ramp up the frequency of the clock signal. The switching circuit configured for controlling the power switch of the boost regulator in response to a clock signal from the oscillator may be a current mode controller.

The switching circuit may further be configured for monitoring an output current of the boost regulator, and in response, limiting the output current within a current reference. A reference varying circuit may be provided to ramp up the current reference in accordance with the voltage to be applied to the reference varying circuit during the start-up period.

In another aspect, circuitry for controlling a boost regulator may comprise a current source and a voltage controlled oscillator (VCO). The current source may charge a capacitor coupled to a node so as to vary a voltage at the node during a start-up period of the boost regulator. The VCO for generating a clock signal is coupled to the node, and may vary a frequency of the clock signal from a minimum level to a normal operation level in accordance with the voltage at the node.

Additional aspects and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Examples of the subject matter claimed herein are illustrated in the figures of the accompanying drawings and in which reference numerals refer to similar elements and in which:

DESCRIPTION OF THE EMBODIMENT

Figure 1:
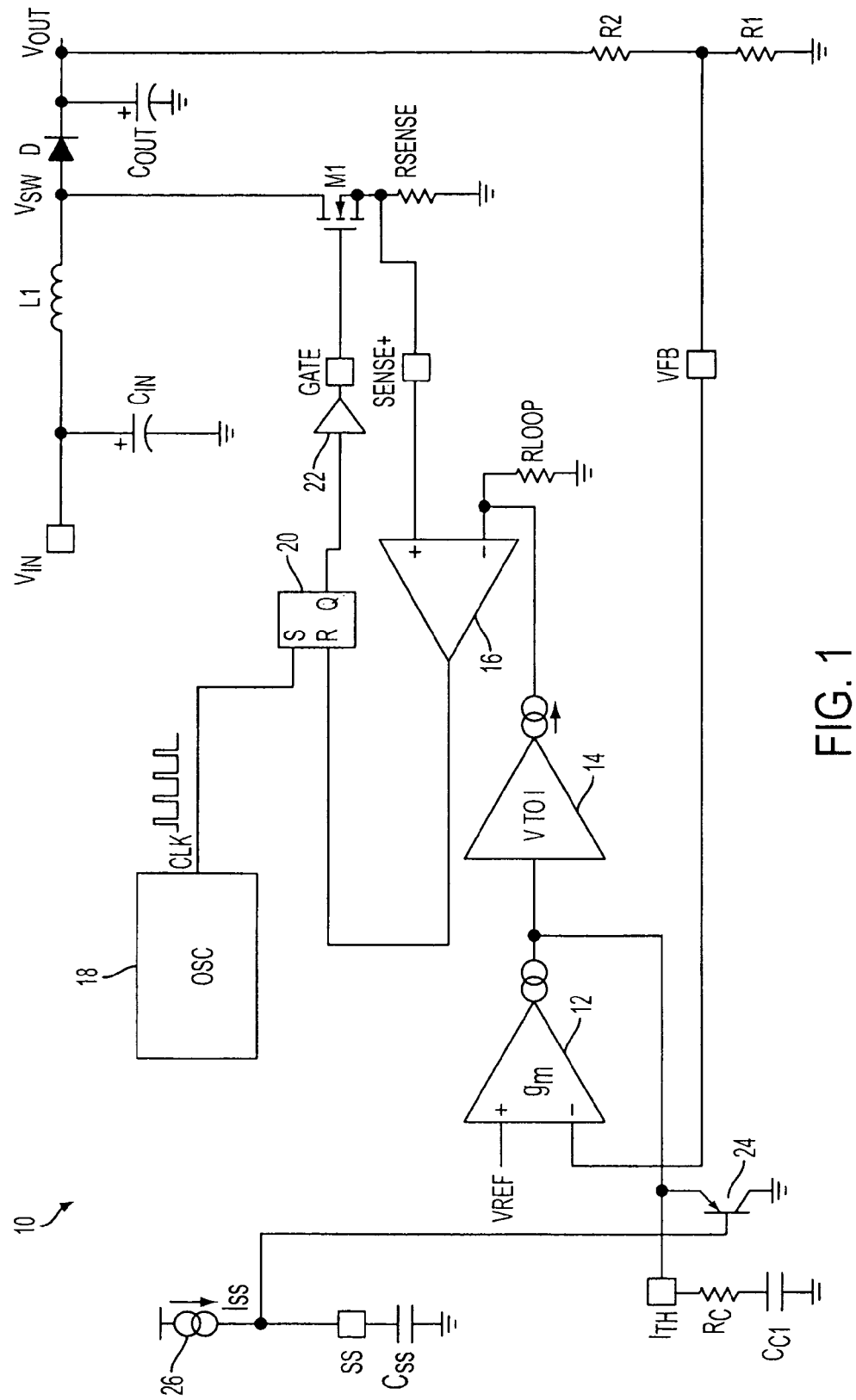
FIG. 1 is a block diagram of a conventional peak current mode boost controller.
Figure 2:
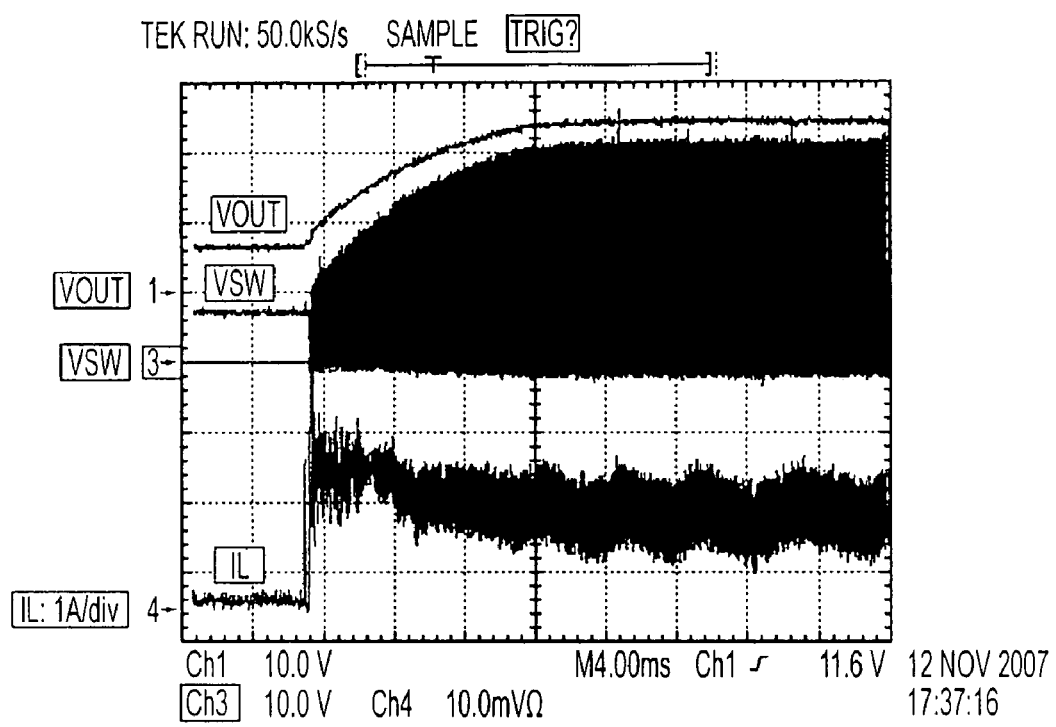
FIG. 2 shows waveforms representing output voltage $V_{OUT}$, switch node voltage $V_{SW}$, and inductor current $I_L$, according to the boost controller of FIG. 1.
Figure 5:
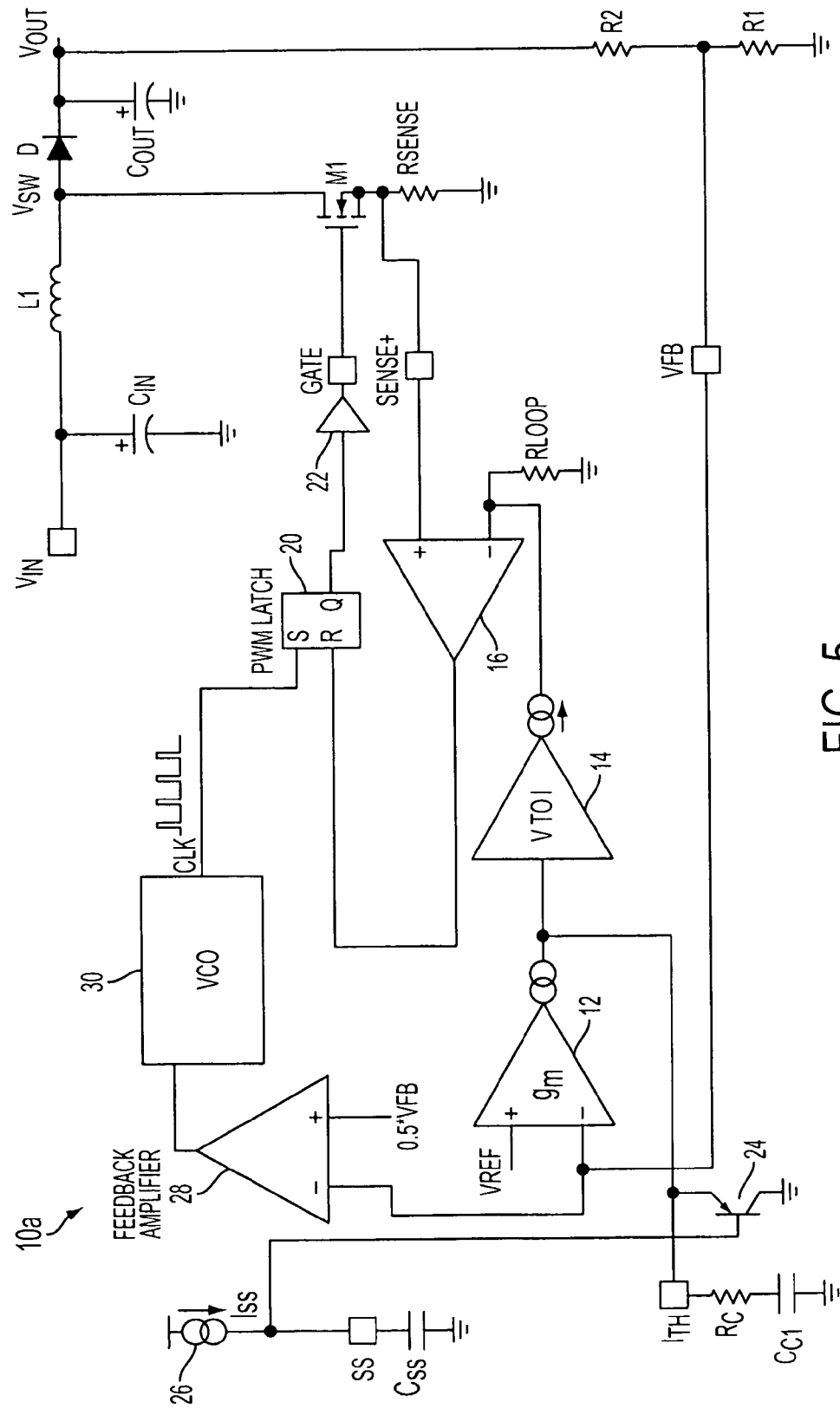
FIG. 5 is a block diagram showing a boost controller including a foldback amplifier to control a voltage to be applied to a voltage controlled oscillator.
Figure 6:
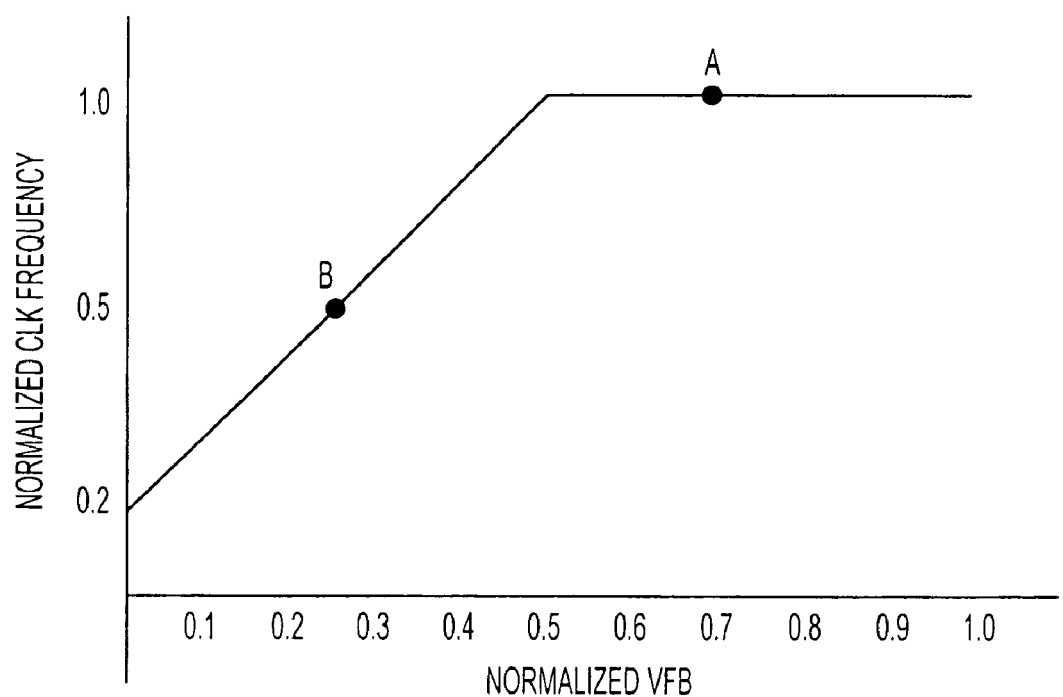
FIG. 6 is a graph showing a relationship between a normalized voltage and normalized clock frequency for the circuit of FIG. 5.

To solve the above described problems which appear during the start-up period of boost controllers, the present embodiment proposes, without the foldback amplifier, ramping up a frequency of a clock signal from a lower value, where the off-time of a power MOSFET is greatly increased, to a steady state value of the boost controllers, over some arbitrary period of time. Components which are commonly shown in figures of the embodiment and in FIGS. 1 and 5 are given the same reference numerals for brevity.

Figure 7:
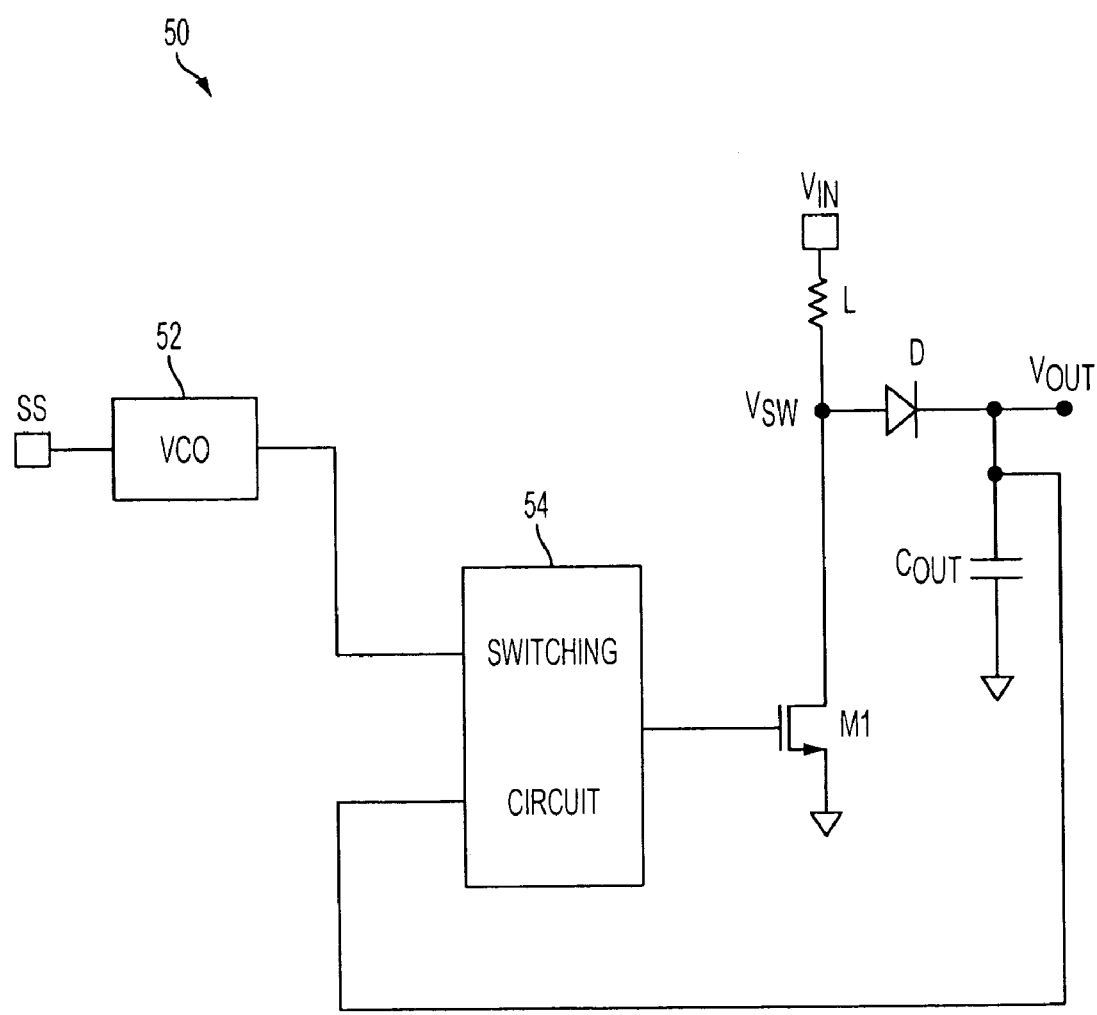
FIG. 7 is a block diagram of a boost controller with soft start frequency ramp according to one embodiment of the disclosure.

FIG. 7 is a block diagram of a boost controller with soft start frequency ramp according to one embodiment of the disclosure. Boost controller 50 in this embodiment can be configured for controlling a frequency of a clock signal to be generated by a voltage controlled oscillator (VCO) 52 during a start-up period. The oscillator may ramp up the frequency of the clock signal in accordance with a voltage at a SS (soft start) pin. As described below, the voltage at the SS pin is varied, i.e., ramps up, during the start-up period. The control circuit further includes a switching controller 54 for controlling power MOSFET M1 in response to the clock signal from VCO 52. VCO 52 and switching circuit 54 may be included on a semiconductor chip, while power MOSFET M1, inductor L, diode D, and output capacitor $C_{OUT}$ may externally be provided to the chip. Power MOSFET M1 may be replaced with any switching element such as a bipolar transistor.

In this embodiment, the voltage on the SS pin to be applied to VCO 52 may have the same initial voltage level upon startup of boost controller 50, and is independent of output voltage $V_{OUT}$. The voltage to be applied to VCO 52 does not have to be 0V, but may always be the same so that VCO 52 starts up with a constant predetermined frequency which is arbitrary and reaches a predetermined normal operation frequency which is also arbitrary. This requirement may not be met by the foldback amplifier implementation shown in FIG. 5 because the voltage on the SS pin is independent of the feedback voltage $V_{FB}$ ($V_{OUT}$) in this embodiment.

Switching circuit 54 is configured for controlling power MOSFET M1. VCO 52 generates a clock signal to be supplied to switching circuit 54 in which the clock signal may be used to turn ON power MOSFET M1. Output voltage $V_{OUT}$ or a current through power MOSFET M1 may be used to turn OFF the MOSFET.

Figure 8A:
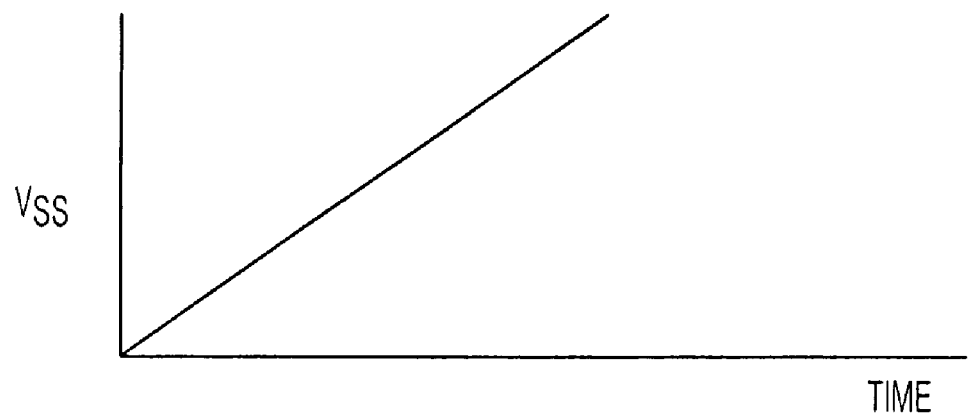
FIG. 8A is a graph showing a linear ramp at a soft start pin.
Figure 8B:
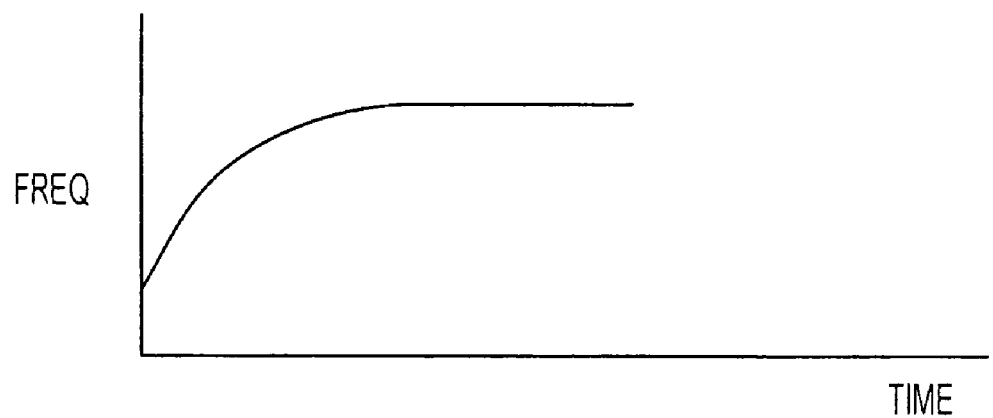
FIG. 8B is also a graph showing an operating frequency of a voltage controlled oscillator.

FIG. 8A is a graph showing a linear ramp at the soft start pin SS, and FIG. 8B is also a graph showing the frequency of the clock signal to be generated by VCO 52. The VCO starts with a minimum frequency, as the soft start pin SS is charged up, and the operating frequency ramps up and eventually approaches its steady state operating frequency. The ramping time to reach the steady state is given by $$T_{RAMP} = V_{SS} * C_{SS} / I_{SS\_CHARGE} \quad (3)$$

where $V_{SS}$ is the voltage on the SS pin, $C_{SS}$ is the external capacitor coupled to the SS pin, and $I_{SS\_CHARGE}$ is the current charging the SS pin.

Once the soft start (start-up) period ($T_{RAMP}$) has expired, there is no difference in operation between the controller in this embodiment and the prior art controller. Because the frequency of the clock signal ramps up from a low level, the off-time of power MOSFET M1 is increased, allowing inductor current $I_L$ to go to 0 A (for example) (see IL in FIG. 15, discussed later). The MOSFET can be protected from being damaged by excessive inductor current $I_L$.

Figure 9:
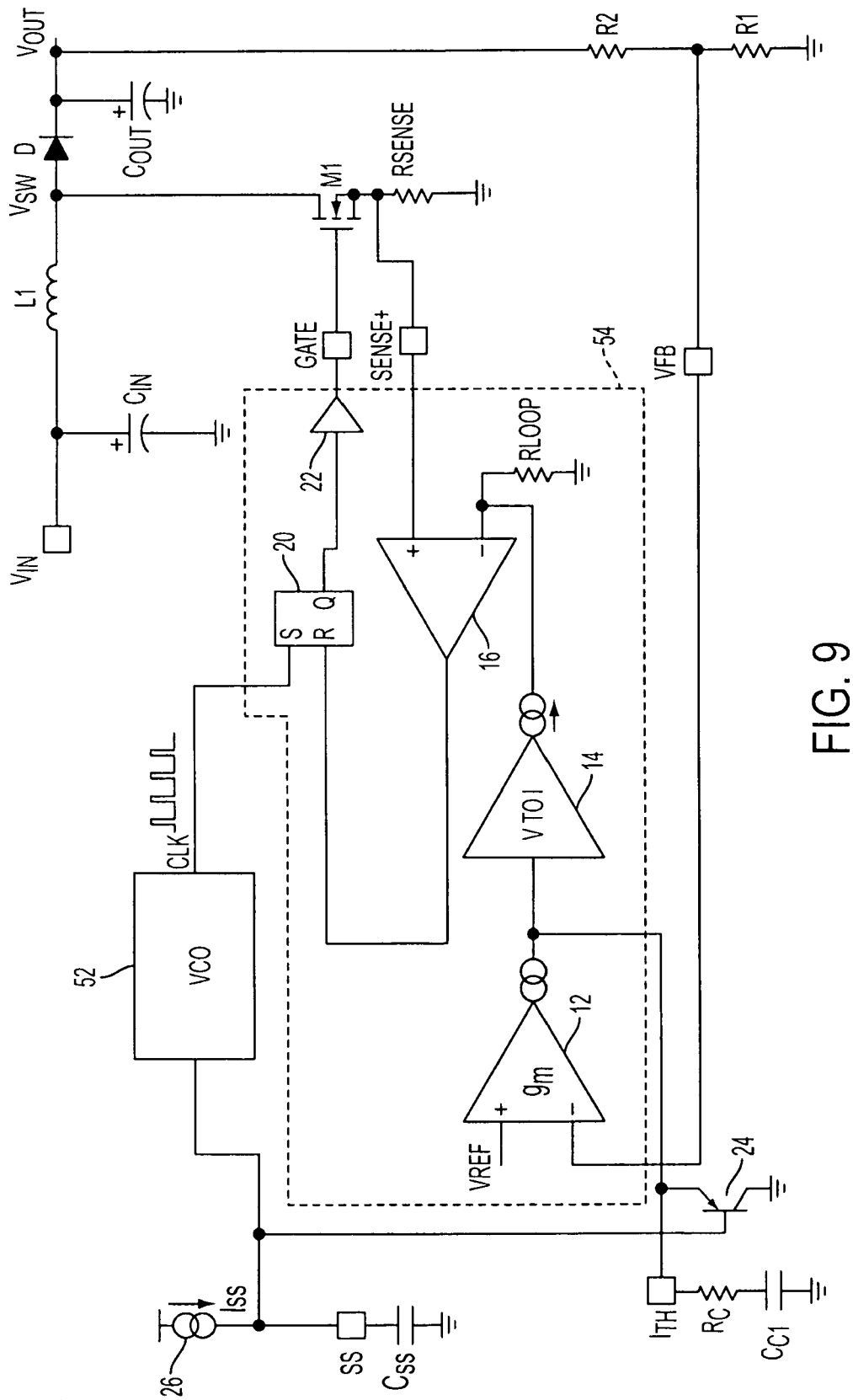
FIG. 9 is a block diagram showing the detailed components of a boost controller as shown in FIG. 7.

FIG. 9 is a block diagram exemplarily showing detailed components of the boost controller shown in FIG. 7. In this example, the boost controller shown in FIG. 9 is a peak current mode controller. A voltage mode controller may also be applicable.

As shown in FIG. 9, switching circuit 54 may comprise error amplifier 12, V to I converter 14, current comparator 16, PWM latch 20, and gate driver 22. As already discussed, the $I_{th}$ pin is an error amplifier output/compensation pin to which the compensation components comprising resistor $R_C$ and capacitor $C_{C1}$ are coupled. Error amplifier 12 compares feedback voltage $V_{FB}$ with reference voltage $V_{REF}$ to generate an error signal which is supplied to the $I_{th}$ pin. The voltage at the $I_{th}$ pin can be clamped by PNP transistor 24. The base of PNP transistor 24 is coupled to the SS pin having capacitor $C_{SS}$ which is charged with current source 26 during the start-up period of boost controller 50. A clamp level of PNP transistor 24 is determined by the voltage on the SS pin which is variable during the start-up period. The current comparator input threshold is adjusted with the voltage at the $I_{th}$ pin.

The voltage at the SS pin is also applied to VCO 52 which increases, during the start-up period, the frequency of the clock signal from a minimum level to a normal operation level in accordance with the voltage at the SS pin (see FIGS. 8A and 8B). As set forth below, VCO 52 is configured for varying charge current and discharge current of an oscillator therein in accordance with the voltage on the SS pin, in order to ramp up the frequency of the clock signal to be supplied to switching circuit 54 (see FIG. 10).

Switching circuit 54 such as current comparator 16 and PWM latch 20, for example, can control power MOSFET M1 to have an on-time which is largely independent of the frequency of the clock signal from the VCO. The on-time of power MOSFET M1 may be determined by the current comparator input voltage, which is voltage $V_{SENSE+}$ across resistor $R_{SENSE}$ indicative of a current through power MOSFET M1. When voltage $V_{SENSE+}$ exceeds the voltage on the inverting input of current converter 16 (peak current sense threshold), current comparator 16 trips and thus, power MOSFET M1 is turned off. The peak current sense threshold is not dependent on the oscillator frequency. The clock signal from VCO 52 turns on power MOSFET M1, and the output from current comparator 16 turns off power MOSFET M1.

Figure 10:
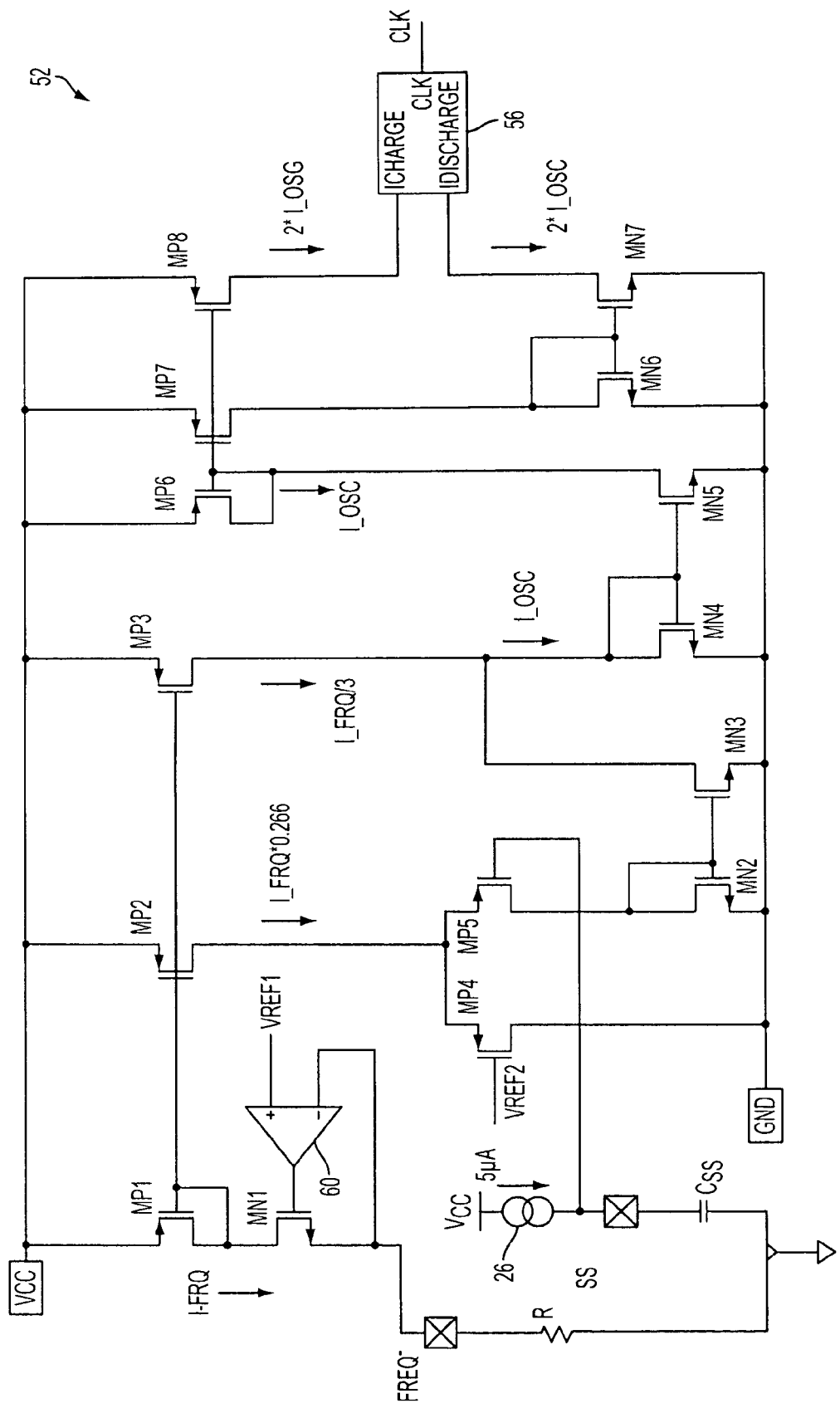
FIG. 10 is a circuit diagram of a voltage controlled oscillator according to one embodiment of the disclosure.

FIG. 10 is a circuit diagram of VCO 52 according to one embodiment of the disclosure. VCO 52 includes an operational amplifier 60, the noninverting input and the inverting input of which are coupled to a reference voltage $V_{REF1}$ and a FREQ pin, respectively. A control transistor MN1 which is a unity gain configuration essentially impresses voltage $V_{REF1}$ on the FREQ pin. The user can program current I_FRQ flowing through transistor MN1 based on a value of an external resistor R coupled to the FREQ pin. Current I_FRQ eventually determines charging and discharging current of an oscillator 56. Current I_FRQ is mirrored over transistor MP1, MP2, and MP3.

A differential amplifier comprising transistors MP4 and MP5 steers the mirrored current (I_FREQ*0.266) from transistor MP2 depending on the voltage on the SS pin. The voltage on the SS pin is applied to the gate of transistor MP5, and a reference voltage $V_{REF2}$ is applied to the gate of transistor MP4. When the SS pin has a ground potential, transistor MP5 takes majority of the current from transistor MP2. The current then passes through transistor MN2 and mirrored over transistor MN3, which subtracts the mirrored current from a current (I_FRQ/3) from transistor MP3. As a result of that subtraction, current I_OSC is obtained. When the voltage on the SS pin is low, current I_OSC has a lower value. As the voltage on the SS pin increases, the current through transistor MP5 decreases and the current through transistor MP4 increases. Thus, current I_OSC increases.

It is noted that a 5 μA current is supplied from current source 26 to charge capacitor $C_{SS}$. As the voltage on the SS pin increases from 0V to 550 mV (for example), the operating frequency is ramped from a low value, where the off-time is greatly increased, to its steady state value. The ramping time to reach the steady state is given by, for example (see equation (3)), $$T_{RAMP} = (0.55V)*C_{SS}/(5 \mu A) = 110E3*C_{SS}.$$

Current I_OSC is mirrored by transistors MN4 and MN5, which turns on transistor MP6. Current I_OSC is mirrored again by transistors MP7 and MP8. Transistor MP8 supplies a charge current (e.g., 2*I_OSC) into oscillator 56. A current from transistor MP7 is mirrored over transistors MN6 and MN7. A current flowing through transistor MN7 represents a discharge current (e.g., 2*I_OSC) from oscillator 56. The charge current and the discharge current can be chosen to be equal to, or different from, each other, by the user. The clock signal having a frequency depending on the charge current and the discharge current is generated from oscillator 56.

Figure 11:
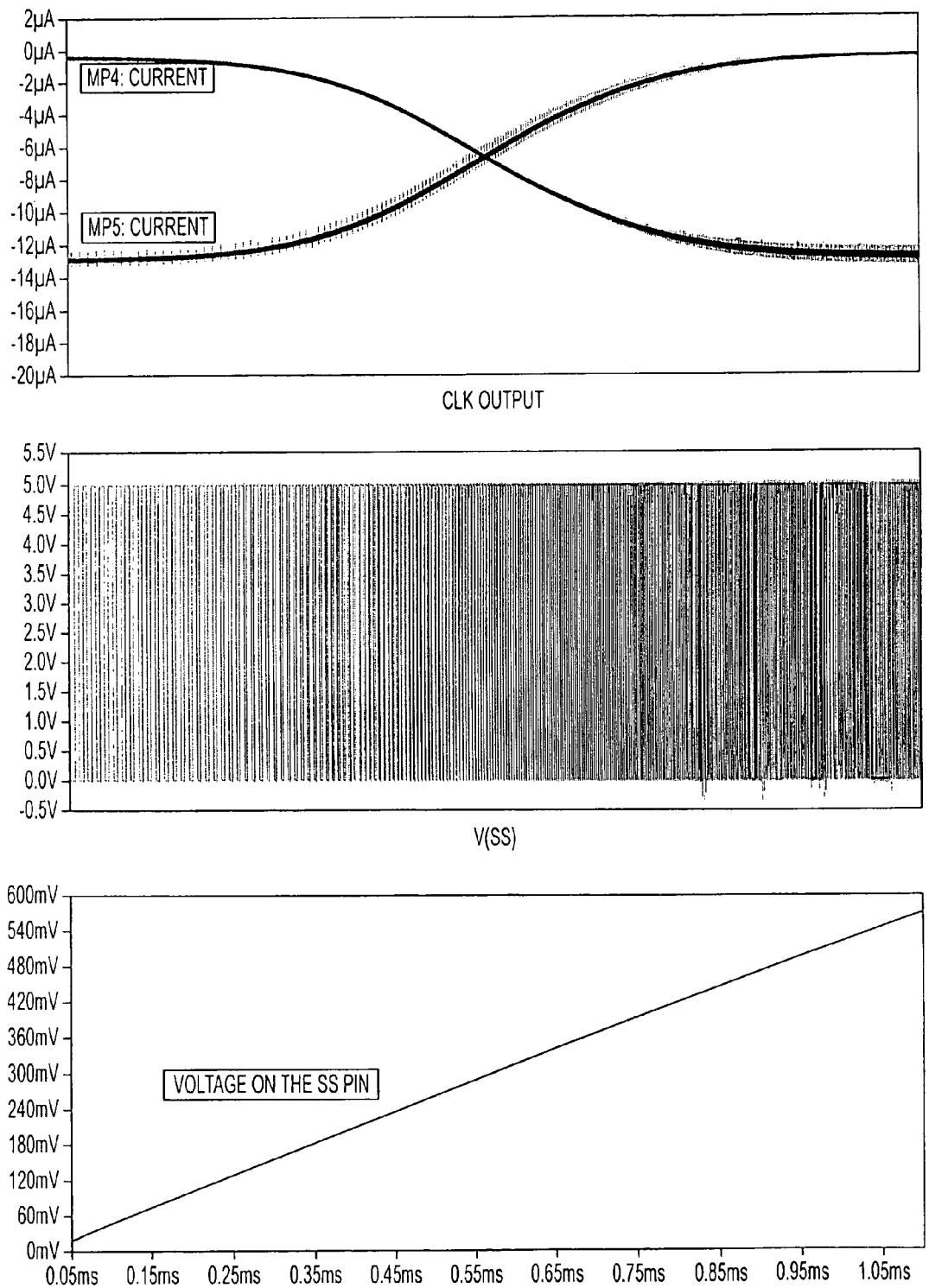
FIG. 11 shows waveforms indicating a relationship among a current flowing through transistor MP4, a current flowing through transistor MP5, a clock signal from VCO 52, and a voltage on a SS pin, shown in FIG. 10.
Figure 12:
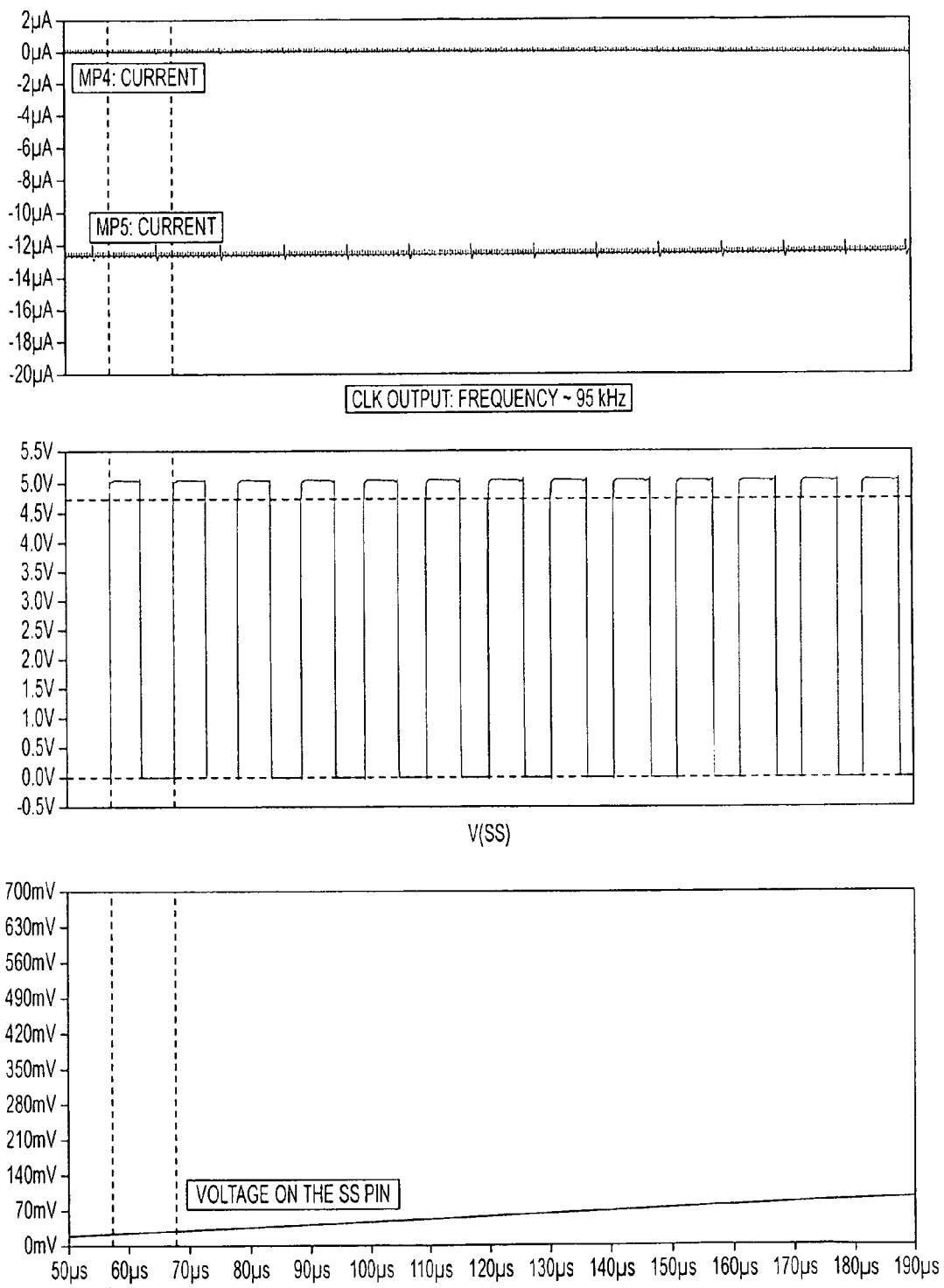
FIG. 12 shows zoomed-in waveforms of FIG. 11.
Figure 13:
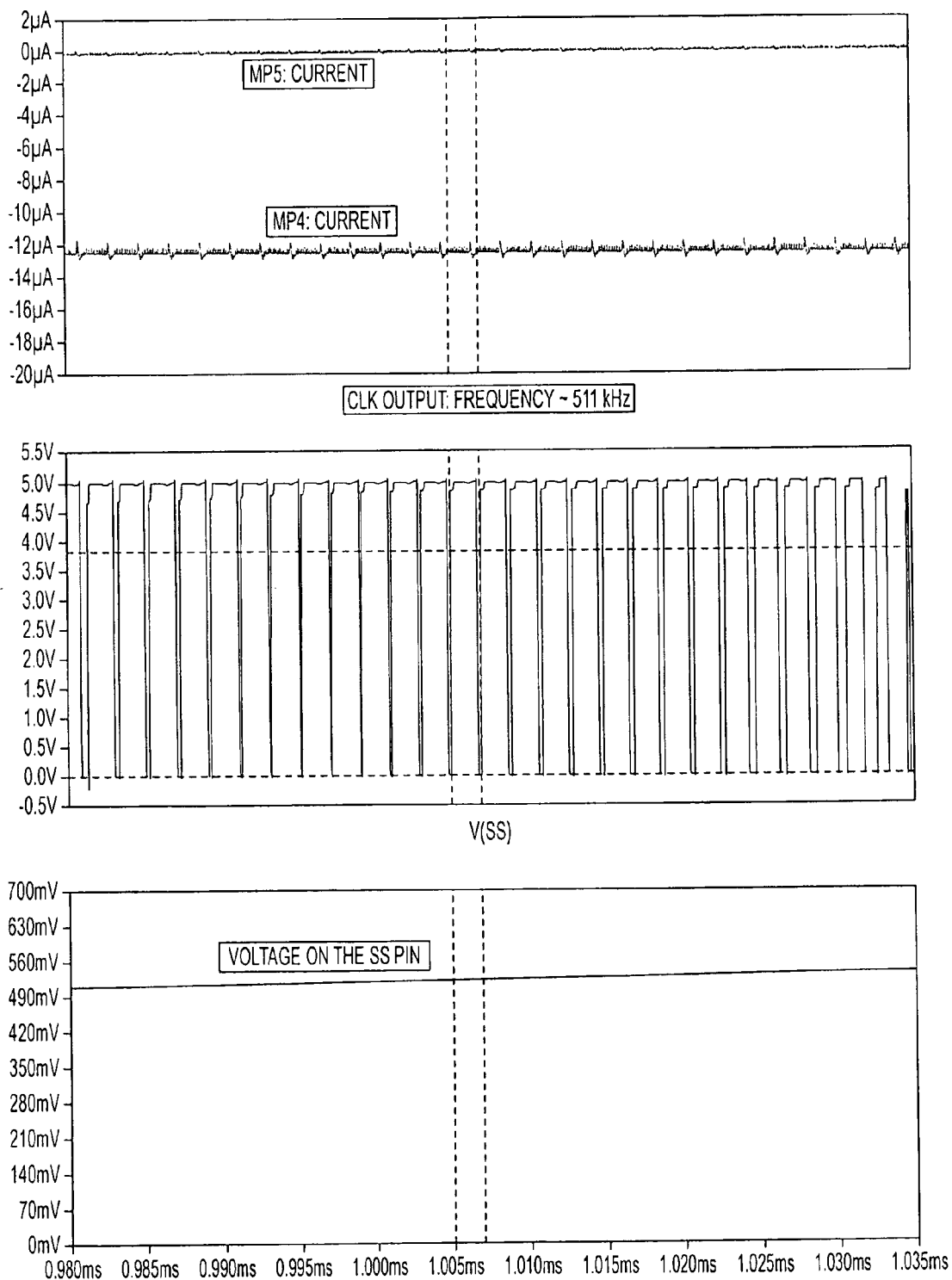
FIG. 13 shows further zoomed-in waveforms of FIG. 11.

FIG. 11 shows waveforms indicating a relationship among the current flowing through transistor MP4, the current flowing through transistor MP5, the clock signal from VCO 52, and the voltage on the SS pin. The top graph shows the current flowing through transistor MP4 and the current flowing through transistor MP5. The bottom graph shows the voltage on the SS pin ramping up depending on the charge of capacitor $C_{SS}$. These graphs show that current flowing through transistor MP4 and current flowing through transistor MP5 are related to the voltage on the SS pin. When the voltage on the SS pin ramps up, the current through transistor MP5 ramps down, whereas the current through transistor MP4 ramps up. This means that when the voltage on the SS pin is almost 0V, the current from MP5 is subtracted from current from transistor MP3. When capacitor $C_{SS}$ is charged, the current from MP2 is steered by transistor MP4 and no current is subtracted from the current from transistor MP3. This indicates that VCO 52 reaches the steady state operation frequency. The middle graph shows the variation of the clock signal relative to the voltage on the SS pin. FIGS. 12 and 13 are the zoomed-in versions of FIG. 11. The frequency of the clock signal is 95 kHz when the SS pin voltage is close to 0V, as shown in FIG. 12. In FIG. 13, the frequency of the clock signal ramps up to the free running frequency programmed by external resistor R (511 kHz). By modulating the frequency of VCO 52, the off-time of power MOSFET M1 can be longer relative to the on-time. Varying the voltage on the SS pin and applying that varying voltage to VCO 52 results in control of the duty cycle of power MOSFET M1.

Figure 3:
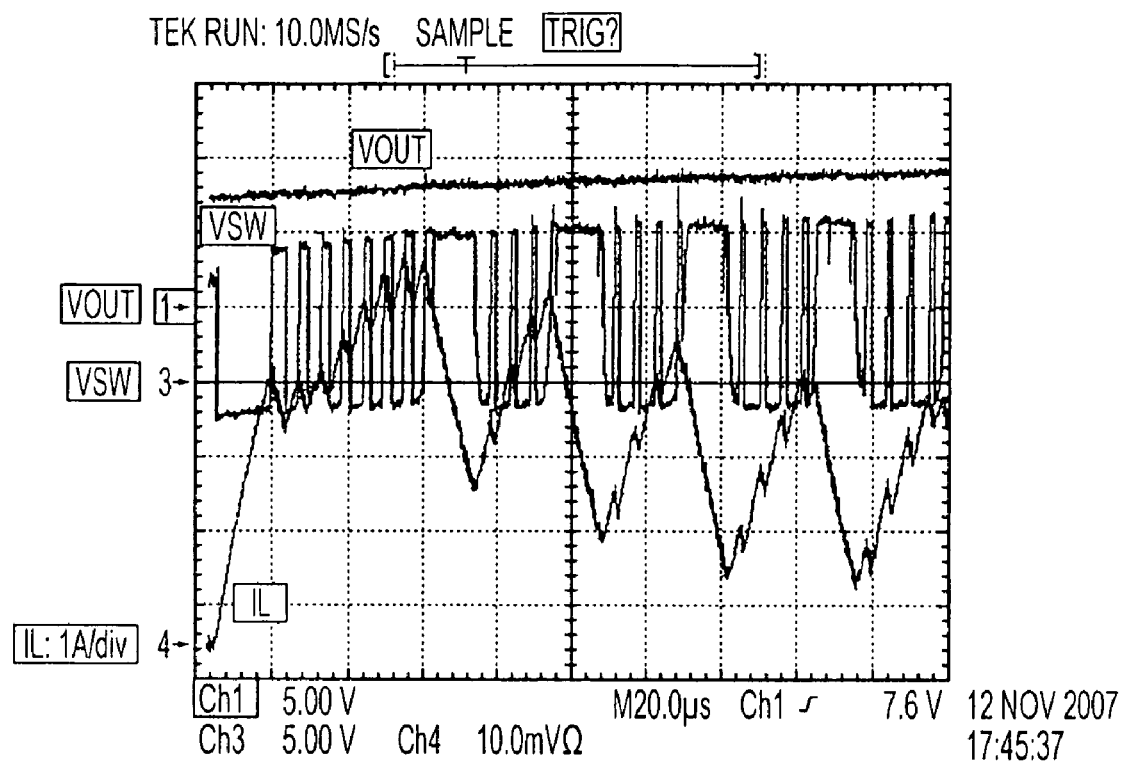
FIG. 3 shows waveforms representing output voltage $V_{OUT}$, switch node voltage $V_{SW}$, and inductor current $I_L$, according to the boost controller of FIG. 1.
Figure 4:
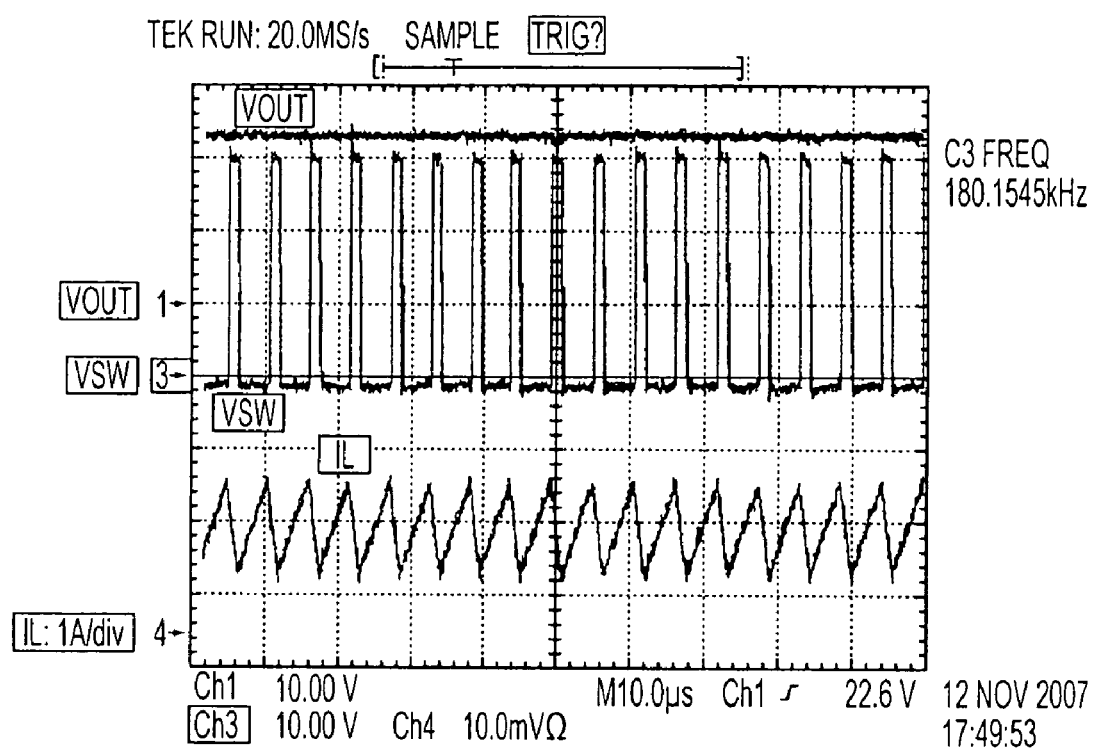
FIG. 4 shows waveforms representing output voltage $V_{OUT}$, switch node voltage $V_{SW}$, and inductor current $I_L$, according to the boost controller of FIG. 1.

According to the embodiment disclosed above, the problems of the conventional boost controller can be solved as shown in the following waveforms. FIGS. 14-17 show waveforms of output voltage $V_{OUT}$, switch node voltage $V_{SW}$, softstart voltage $V_{SS}$ (voltage on the SS pin), and inductor current $I_L$. These figures show that the frequency of the clock signal ramps up from a lower value, and the off-time of power MOSFET M1 can greatly be increased. Accordingly, inductor current $I_L$ can go to 0 A (for example) during the off-time of power MOSFET M1 in order to avoid the current from exceeding its steady state maximum level (see FIG. 3).

Figure 14:
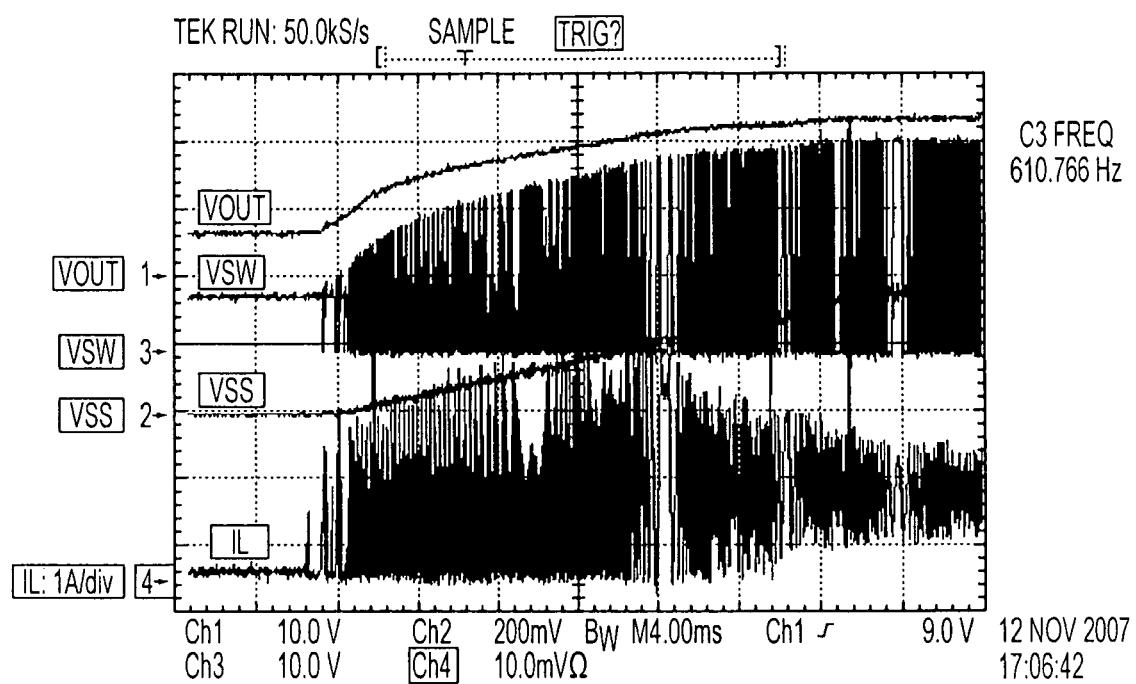
FIG. 14 shows waveforms of output voltage $V_{OUT}$, switch node voltage $V_{SW}$, softstart voltage $V_{SS}$, and inductor current $I_L$, according to one embodiment of the disclosure.

FIG. 14 shows that output voltage $V_{OUT}$ ramps up from 6.5V to 24.5V in 25 ms. The corresponding switch node voltage $V_{SW}$, voltage on the SS pin $V_{SS}$, and inductor current $I_L$ waveforms are also shown.

Figure 15:
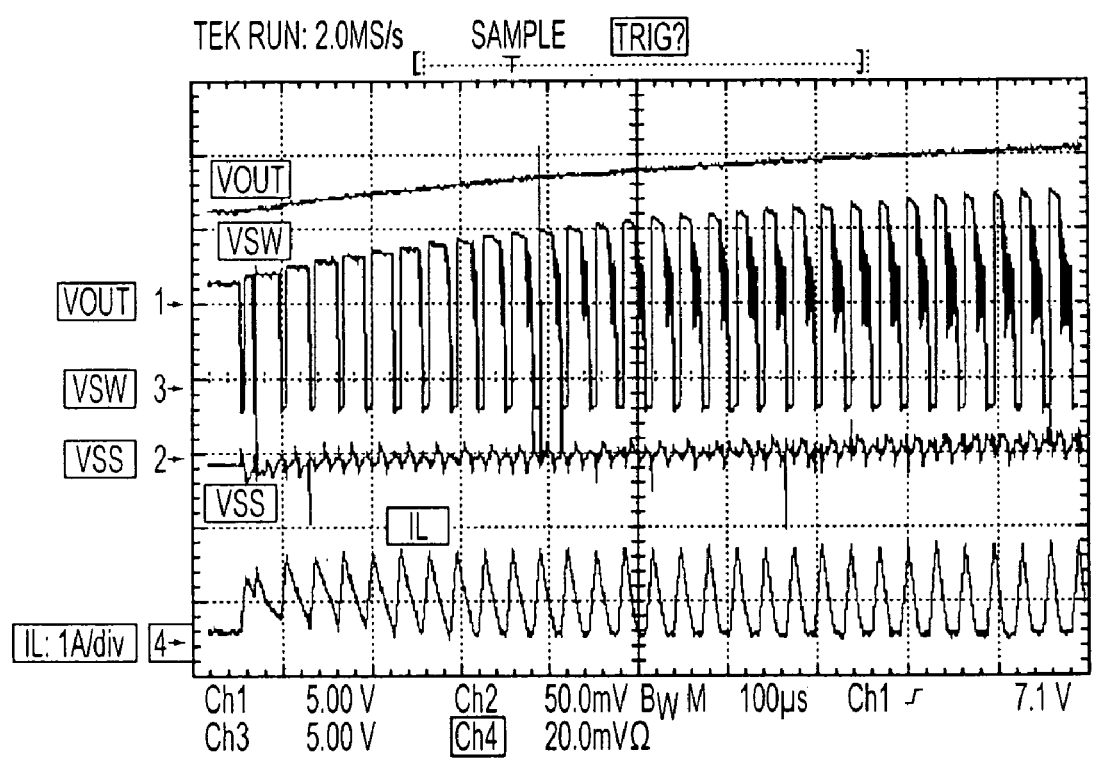
FIG. 15 shows waveforms of output voltage $V_{OUT}$, switch node voltage $V_{SW}$, softstart voltage $V_{SS}$, and inductor current $I_L$, according to one embodiment of the disclosure.

FIG. 15 shows zoomed-in waveforms of FIG. 14 showing the first pulse (after the chip is enabled) of inductor current $I_L$ and switch node voltage $V_{SW}$. Softstart voltage $V_{SS}$ slowly ramps up from 0V, through charging external capacitor $C_{SS}$ by internal current source 26. Inductor current $I_L$ ramps up, but completely decays to zero because the off-time of power MOSFET M1 is long enough due to slowly-ramping-up softstart voltage $V_{SS}$. Accordingly, $\Delta_{IL\_NEG}$ in equation (2) becomes significant enough to allow the inductor current to go to 0 A (for example). This can prevent the inductor current from exceeding the steady state maximum level (see inductor current $I_L$ in FIG. 3).

Figure 16:
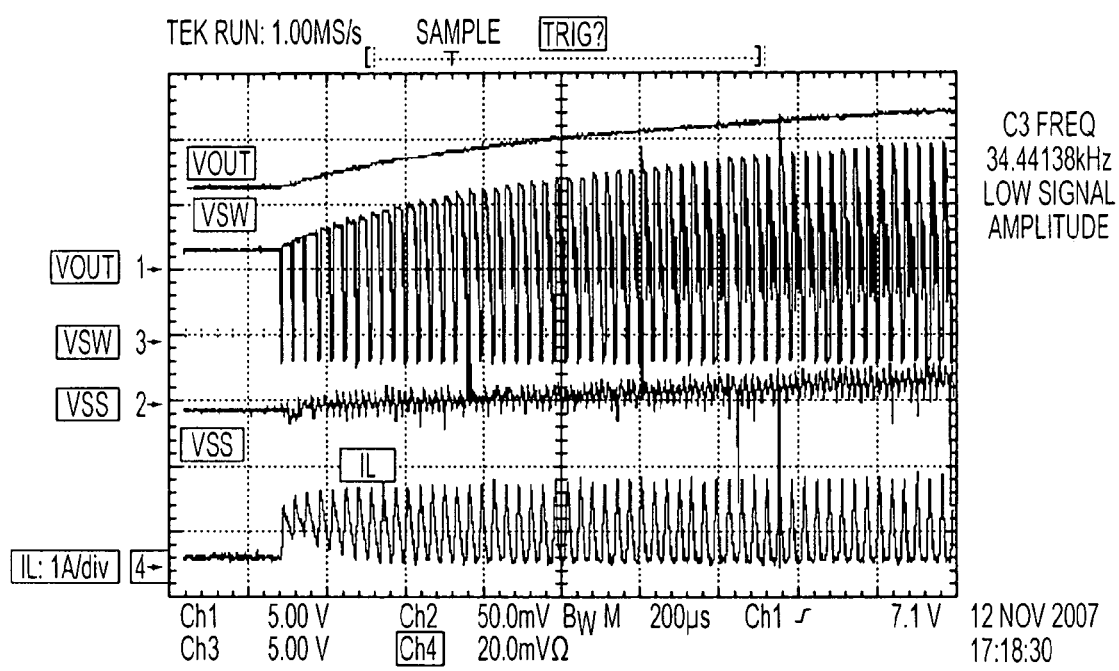
FIG. 16 shows waveforms of output voltage $V_{OUT}$, switch node voltage $V_{SW}$, softstart voltage $V_{SS}$, and inductor current $I_L$, according to one embodiment of the disclosure.

FIG. 16 shows another zoomed in waveforms of FIG. 14 showing the first pulse (after the chip is enabled) of inductor current $I_L$ and switch node voltage $V_{SW}$. Inductor current $I_L$ is well behaved without large peaks on the inductor current $I_L$ waveform. In this example, the frequency of the clock signal from VCO 52 during the start-up period is 34.5 kHz, which is around five times less than the user selected free running frequency of 180 kHz (see FIG. 17).

Figure 17:
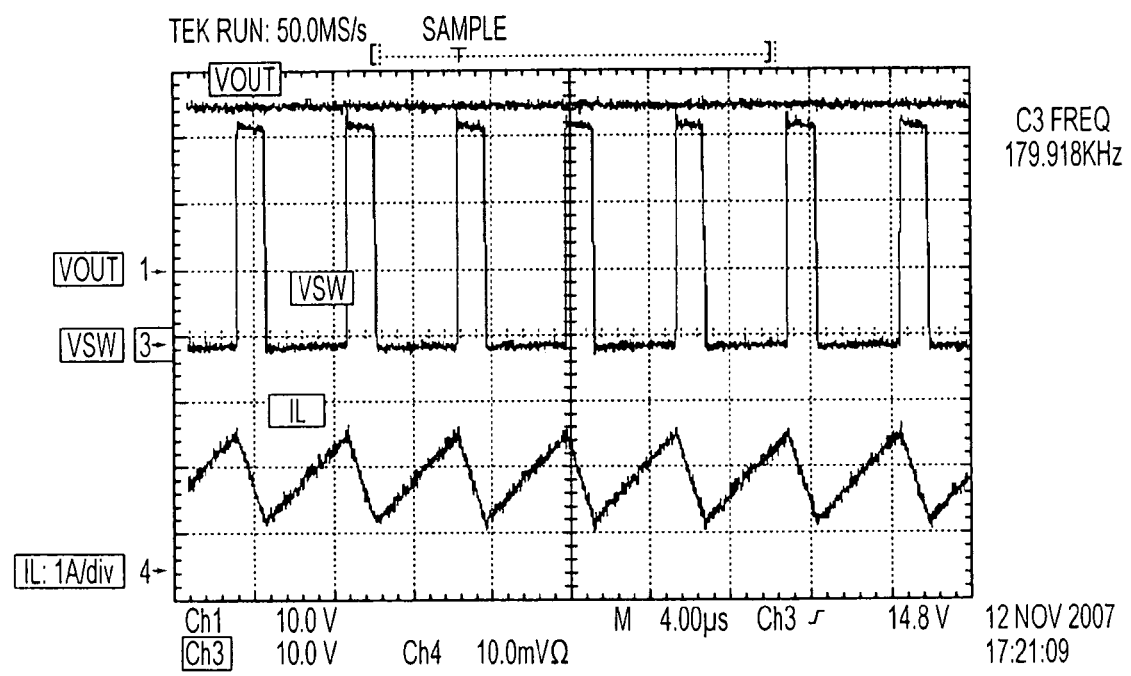
FIG. 17 shows waveforms of output voltage $V_{OUT}$, switch node voltage $V_{SW}$, softstart voltage $V_{SS}$, and inductor current $I_L$, according to one embodiment of the disclosure.

FIG. 17 shows waveforms in normal operating condition. this waveform shows that output voltage $V_{OUT}$ reaches the final value of 24.5V, and inductor current $I_L$ and switch node voltage $V_{SW}$ are in normal operating conditions. The free running frequency is 180 kHz, which is set by the user.

Having described embodiments, it is noted that modifications and variations can be made by person skilled in the art in light of the above teachings. It is therefore to be understood that changes may be made in the particular embodiments disclosed that are within the scope and spirit of the disclosure as defined by the appended claims and equivalents.

What is claimed is:

1. Control circuitry for controlling a boost regulator during a start-up period, comprising:
   an oscillator for generating a clock signal, the oscillator ramping up a frequency of the clock signal in accordance with an voltage to be applied to the oscillator and varied during the start-up period; and
   a switching circuit configured for controlling a power switch of the boost regulator in response to the clock signal from the oscillator, the switching circuit controlling the power switch to have an on-time which is largely independent of the operating frequency of the oscillator;
   the voltage to be applied to the oscillator having the same initial voltage level upon startup of the control circuitry, independent of an output voltage of the boost regulator.

2. The control circuitry according to claim 1, further comprising a charging circuit configured for charging a capacitor during the start-up period to generate the voltage to be applied to the oscillator, the voltage being varied in accordance with a charge of the capacitor.

3. The control circuitry according to claim 1, wherein the oscillator increases, during the start-up period, the frequency of the clock signal from a minimum level to a normal operation level in accordance with the applied voltage.

4. The control circuitry according to claim 1, wherein the oscillator is configured for varying charge current and discharge current therein in accordance with the applied voltage in order to ramp up the frequency of the clock signal.

5. The control circuitry according to claim 1, wherein the switching circuit configured for controlling the power switch of the boost regulator in response to a clock signal from the oscillator is a current mode controller.

6. The control circuitry according to claim 1, wherein the switching circuit is further configured for monitoring an output current of the boost regulator, and in response, limiting the output current within a current reference,
   the control circuitry further comprising a reference varying circuit configured for ramping up the current reference in accordance with the voltage to be applied to the reference varying circuit during the start-up period.

7. Circuitry for controlling a boost regulator comprising:
   a current source for charging a capacitor coupled to a node so as to vary a voltage at the node during a start-up period of the boost regulator; and
   a voltage controlled oscillator (VCO), coupled to the node, for generating a clock signal, the VCO varying a frequency of the clock signal from a minimum level to a normal operation level in accordance with the voltage at the node.

* * * * *